Nov. 27, 1923.
C. HERBST
1,475,631
THERMALLY CONTROLLED CIRCUIT BREAKER
Filed Aug. 15, 1921
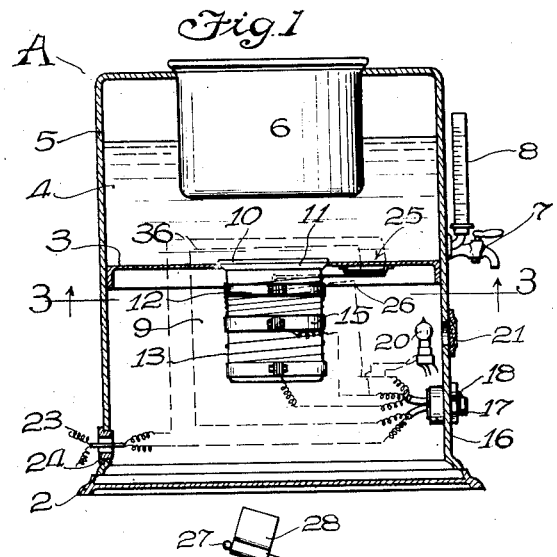
Inventor
Charles Herbst
By Maurer Boettcher Dienner
Attorneys Patented Nov. 27, 1923.

1,475,631

UNITED STATES PATENT OFFICE.

CHARLES HERBST, OF CHICAGO, ILLINOIS, ASSIGNOR TO ALFRED HERZ, OF CHICAGO, ILLINOIS.

THERMALLY-CONTROLLED CIRCUIT BREAKER.

Application filed August 15, 1921. Serial No. 492,246.

*To all whom it may concern:*

Be it known that I, CHARLES HERBST, a citizen of the United States, residing at Chicago, in the county of Cook and State of Illinois, have invented a certain new and useful Improvement in Thermally - Controlled Circuit Breakers, of which the following is a full, clear, concise, and exact description, reference being had to the accompanying drawings forming a part of this specification.

My invention relates to thermally controlled circuit breakers. While I have shown and described my invention particularly as applied to water-heaters, the invention is not to be limited to such use.

While the invention is particularly applicable to heating circuits, it is also valuable for general control work of power, lighting and the like circuits.

Usually, thermally controlled circuit breakers are based upon the principle that excessive flow of current will create a rise in temperature, and by the employment of a fusible member, which is directly inserted in the line and subject to the current flow, the circuit may be easily interrupted as the fusible member melts. It is customary to insert a fuse in the line adjacent to the apparatus to be protected. The fuse melts upon an excessive flow of current and the circuit is opened and will not be closed again until the fuse is replaced.

Although, I rely upon a fusible member to control the breaking of the circuit, I employ the fuse as a controlling element for a switch or other current interrupter. The fusible element which I employ is not subject to the flow of current, and in fact, has no direct relation to current flow.

I provide a thermally controlled element, similar to a fuse, subject to the heat developed by the flow of current through the heating coils while in normal operation, which heat at times may reach a temperature destructive of some existing member, caused by a condition independent of the current flow. The element holds a switch blade, or other circuit controlling device in such position that so long as there is no excessive rise in temperature, the circuit will be uninterrupted, but as soon as the thermally controlled element registers an undue rise of temperature, the circuit is opened by the release of the switch, or other circuit controller.

It is to be recognized as an important feature of my invention that the thermally controlled element releases a switch, which normally tends to move, as for instance to open position, the switch being restrained from such movement by the thermally controlled element, and that the switch remains in such open position until the thermally controlled element is replaced. This replacement is made after the heating device has been cooled off. A steam table is employed in restaurants, on lunch counters, and the like for keeping food hot, and yet accessible for inspection. A number of various size pans for containing the food are set in openings at the top of the steam chest. The lower portion contains water and is provided with one or more wells, in the shape of cylindrical tanks, secured by a soldered seam to the bottom of the steam chest, and around these wells are wrapped heating elements. The water circulates in and out of the wells and is heated by the heating coils, part of which water is frequently drawn off for use, and oftentimes, the level is caused to lower by evaporization.

If the water level is permitted to get so low in the steam chest and heating wells that the soldered joint between the flanges of the heating vessels and the bottom of the steam chest is exposed, the solder may melt and the vessel destroyed.

According to my invention, I provide a thermally controlled element in the form of a fuse, which bears against the wall of the heater, and which is subject to the heat of the heating coil. This fuse is placed adjacent to the top of the water well, preferably between the heating coil and soldered seam, so that lowering of the water level below the seam which is to be protected at once affects the fuse.

The fuse is in general part of the switch, which controls the heating circuit. The fuse is not related electrically to the circuit. A base member is mounted near the water well. A switch blade is suitably carried thereon, and this blade tends to move outwardly, toward open position, being urged by a suitable spring acting against the fuse. The fuse normally holds the blade closed. The fuse is laid against the water well to permit a suitable portion to contact with the wall of the well, in order that the fuse will be subjected to the heat developed. The fuse melts on an excessive rise of temperature and the switch blade thereby being released moves to open position. The circuit is then interrupted until normal conditions return.

The invention is not to be limited to heating vessels of this character, as it may be applied to all kinds of electrical apparatus in which there is danger of overheating, whether those devices be fundamentally heating devices or power devices.

The description of the invention shall be directed particularly to the protection of the soldered seam in the heating vessel. But, the requirement may arise where it is necessary to protect other joints or parts from damage by heat. Hence, the protection extends not to the soldered joint solely, but to any part of the vessel or the whole vessel.

In the accompanying drawings:

Figure 1 is a vertical sectional view of a water heater or steam table;

Figure 2 is a front elevational view of the same on a reduced scale;

Figure 3 is a sectional view taken on line 3—3 of Fig. 1, looking in the direction of the arrows;

Figure 4 is a detail illustration of the thermally controlled circuit breaker as used in connection with a water heater;

Figure 5 is a side elevational view of the same; and

Figure 6 is a detail view of a clip for holding the fuse in operative position.

I shall first describe the water heater A in general to make more clear the particular advantage my invention has as a thermally controlled circuit breaker and to what extent it may be used where it is desirable to control a circuit by the heat developed.

Referring to Figure 1, the water heater is shown in the form of a steam table 5. The steam table 5 comprises the base 2, the lower compartment divided by the wall 3 from the upper compartment or reservoir 4, which I term a steam chest, in which steam is generated and retained, and a greater portion of the water is held. The warming pots 6 are suitably retained in the top wall, and are partially submerged in the hot water and partially exposed to the steam, as is well known in the art. A faucet 7 is provided for the purpose of draining the reservoir 4, or drawing off a small quantity of hot water for use, which is replenished in any suitable way, such as a connection leading to a suitable source of supply (not shown). A gauge 8 has also been provided to indicate the level of the water in the reservoir.

In the lower compartment, a heating vessel 9 is disposed, which vessel may be suspended from the wall 3, so that the interior of the vessel has communication with the upper compartment 4. This vessel 9 is provided with a rim 10 at the open end and secured preferably by soldering, as indicated at 11, because of the cheapness of such a joint. A pair of heaters 12 and 13 are arranged to heat the heating vessel 9 to bring the liquid to a desired temperature. The heater 12 comprises a winding of a number of turns of fine wire, and the heater 13 comprises a winding of a number of turns of coarser wire, so that the wattage consumed by the heater 12 is considerably less than the wattage consumed by the heater 13. The windings 12 and 13 are wound upon the vessel with a layer of insulation interposed to prevent short circuiting of the turns. The windings are anchored to the heating vessel 9 as by means of terminal bands 15, which are mounted between and at the ends of the windings, and which serve as electrical terminals and as securing means.

The heaters 12 and 13 are controlled by the switch 16, which is operated by means of a handle or knob 17 having formed thereon a pointer 18. A suitable plate or escutcheon 19 is carried by the protruding portion of the switch 16. The switch 16 has three positions which are indicated by suitable legends on the escutcheon 19, the first position being had when the heaters 12 and 13 are connected in the circuit in parallel relation. In the next position, the switch 16 connects the low wattage coil in the circuit, while in the last position the switch disconnects both of the coils so that they are inactive. The circuit is completely broken and no heating takes place. A pilot light 20, which is mounted on a suitable support is permanently connected across the terminals of the low wattage heater 12. A bull's eye or fresnel 21 is placed over an opening in the base to indicate the condition of the pilot light 20. The lead wire 23, which may be connected to a suitable terminal, enters the base through a suitable insulation 24.

The circuit is controlled by the thermally controlled switch 25, which is automatically governed by the temperature of the heating vessel 9. A fusible member 26 is interposed between the heating coil 12 and the solder seam 11, and is made to lie against the periphery of the heating vessel 9, in order to be in direct contact with the part to be protected from too great heating by the coil 12. As shown in Figure 4, the fuse may be disposed so as to make considerable surface contact with the vessel 9, or a tangential contact may be found preferable. The free end of the fusible member 26 is formed with a bead 27, so that the fuse will be held in the groove formed by the curved edge of the clip 28. The clip 28 is provided with a flat portion which permits of soldering, brazing or otherwise fastening to the underside of the wall 3. While this clip 28 is employed, it is possible to provide any form of holding means for this end of the fusible member 26.

The opposite end of the fusible member 26 is provided with an eye 29 which receives a stud 30 carried at the free end of the switch blade 31. The surface of the stud is preferably roughened, so as to prevent the eye 29 from slipping thereoff.

The thermally controlled switch 25 is mounted and carried as a unit on the under side of the wall 3, preferably located adjacent to the heater 9 and readily accessible in case the fuse 26 is to be replaced and the switch reset. The mounting plate 32 is centrally raised by the provision of side flanges 33 terminating in outwardly turned ends 34, which ends 34 provide adequate adhering surface for the soldered, or otherwise formed, joint with the wall 3. The switch blade 31 is pivotally carried by the bolt 35 on the mounting plate, with the necessary washers and lock nuts to keep the blade 31 properly mounted, provided, the lead 36 of the heating circuit being clamped thereon at the outer end. Thus, the bolt 35 is subject to the flow of current, and in order to prevent short circuiting through the mounting plate 32 an insulator sleeve 37 surrounds the bolt 35 where it passes through the plate 32. Plate insulation 38 is provided on each side of the mounting plate 32 so as to prevent the current from flowing therethrough from the washers 39. This plate insulation may be made out of mica, or other suitable material. A terminal 40, of any type, is mounted on the plate 32 in such relative position as preferably to engage the switch blade 31 near the outer end. The other lead 41' of the heating circuit is properly clamped thereto. The mounting plate 32 is likewise insulated from the current at the terminal 40.

The switch blade 31 is normally closed, but tends to move to open position by the spring 41. The blade is restrained from such movement by the fusible member 26 until the temperature of the heater, at the point of contact, rises to a predetermined point, whence the fuse melts and the switch opens. The spring 41 is anchored upon the bolt 42 carried by the base 32. The short leg of the spring 41 bears against a stop bolt 44, which stop bolt is provided to limit the movement of the switch blade 31 when being opened.

From experience, it has been found advisable to insulate the spring 41. Consequently the long leg thereof has been fastened to the blade 31 in such a manner as not to come in contact with the live portion of the blade. The free end of the blade 31 is turned down, as indicated at 45, in order to carry properly the stud 30. It will be seen from Fig. 5 that this stud 30 is insulated from the turned down portion in a manner similar to that of insulating the bolt 35 relative to the base 32. Hence, the bracket 46, to which the spring 41 attaches, is not subject to the flow of current.

Thus, it is to be noted that as the fuse 26 is located adjacent to the joint 11, it is subject to the heat of that portion of the vessel, and therefore, the switch 25 will be actuated to render the heating coils 12 and 13 inoperative as soon as the temperature builds up to a point beyond safety for the joint. The fuse 26 being directly above the heating coil 12 will be governed directly by the heat thereof, so that, if the water level recedes below the area adjacent the fuse 26, the temperature of that portion of the vessel will rise and act directly upon the fuse before reaching or affecting the soldered seam.

The operation of the device is as follows:

Assume, that the device has been in operation for a considerable period of time and the water level within the steam chest is caused to lower, either by evaporation or by drawing off a small quantity for use, below the seam 11 in the heating vessel 9. The water will no longer keep this portion of the heater cool, and as a result, the heat from the coil 12 or coil 13 will act directly thereon. It will be noted that the fuse 26 lies in the path of the heat which tends to travel to the joint 11 from either heating coil. When the coil 12 is active, it is obvious that heat from this coil in traveling toward the seam 11, will encounter the fuse and melt the same. When the coil 13 is active, the heat which travels toward the seam 11 along the wall of the vessel, will first encounter the said fuse. The temperature will immediately rise to the temperature of fusion and cause the fuse 26 to melt, which releases the blade 31. The spring 41 being of sufficient strength, will cause the switch blade 31 to break the circuit between itself and the contact 40 by moving outwardly. This condition is indicated immediately by the going out of the pilot light 20.

To restore the device to operation the pots 6 are removed and the heating vessel is permitted to cool. As soon as this is done and the surface against which the fuse 26 bears cools sufficiently, the device is inverted. The fuse may then be replaced with comparative ease, for all that is required in the replacement is to substitute a new fuse member provided at each end with means for facilitating rapid connection. The device will then be in proper condition for further operation. After it is set up, cool water is fed into the steam chest until the proper level is reached, as will be indicated by the gauge 8. No other soldered joint of the device is affected by the lowering of the water level as the fuse is located so as to be affected immediately, that is, the heat is not permitted to travel the walls of the heater 9, and from there, to be transferred to the entire device before melting the fuse 26.

From the foregoing description, it is evident that my device has great utility as a thermally controlled circuit breaker and possesses certain advantages, as such, to an extent where it may be adapted to devices other than electric water heaters. The point at which the circuit breaker will actuate, is dependent upon the temperature of fusion of the member 26, which, of course, may be determinable by the use to which the device is put.

I claim:

1. In combination, a vessel having a fusible joint, a heating element for said vessel, thermally operable means for rendering said heating element inactive, said thermally operable means being disposed between the heating element and said fusible joint and in contact with the vessel.

2. In combination, a vessel having a fusible joint, a heating circuit for heating said vessel and a circuit breaker disposed between said heating circuit and said fusible joint, and in contact with the vessel, said circuit breaker being controlled by conduction of heat to said joint for rendering the heating circuit inactive.

3. In combination, a vessel having a fusible joint, a heating circuit for heating said vessel and a circuit breaker contacting with said vessel between the heating circuit and the fusible joint and controlled by conduction of heat to said joint for rendering the heating circuit inactive.

4. In combination, a heating vessel, a heating circuit for heating said vessel and a circuit breaker contacting with the vessel and controlled by conduction of heat thereto independently of the current flow in said heating circuit for rendering said circuit inactive.

5. In combination, a heating vessel having a fusible joint, a heating circuit for heating said vessel, a switch in said circuit, spring means tending to open said switch and thermally operable means independent of current flow in said circuit for holding said switch closed, said thermally operable means being disposed between the heating circuit and said fusible joint and in contact with the vessel and being controlled by conduction of heat to said joint for releasing said spring means to permit opening of said switch.

6. In combination, a heating vessel, a heating circuit for heating said vessel, a switch in said circuit, said switch having a movable switch member, means tending to move said member to open position, and a fusible link fixed at one end and connected to said movable switch member to restrain opening of said member, said fusible link contacting with said vessel and being controlled by heat conduction thereto for releasing the switch member to permit opening of said switch.

7. In combination, a casing, a heating vessel carried by said casing, a heating circuit for said heating vessel, a switch mounted adjacent to said vessel on said casing, means for normally tending to move said switch to open position, and a thermally controlled element in operable relation with said switch extending to said vessel and disposed so as to be subject to the heat developed.

8. In combination, a casing, a heating vessel carried by said casing, a heating circuit for said heating vessel, a switch disposed adjacent to said circuit, and a thermally controlled element for controlling the operation of said switch, said element extending to said vessel so as to contact therewith between said circuit and said casing.

9. In combination, a casing, a heating vessel carried by said casing, a switch disposed adjacent to said circuit, means acting to hold said switch in open position, a thermally controlled element restraining said movement, said thermally controlled element being flexible and independent of said circuit, and lying so as to make peripheral contact with said heating vessel.

10. In combination, a vessel having superposed compartments divided by a wall, a heating vessel suspended from said wall, a circuit having a heating coil surrounding said heating vessel, a switch in said circuit, said switch including a switch member pivotally mounted upon said wall, means tending to open said switch and a fusible link fixed at one end and extending in contact with said vessel and connected at its opposite end to said switch member for holding said member closed.

In witness whereof I hereunto subscribe my name this 9th day of August, 1921.

CHARLES HERBST.